US007489485B2

(12) United States Patent
A F Klercker Alakula et al.

(10) Patent No.: US 7,489,485 B2
(45) Date of Patent: Feb. 10, 2009

(54) METHOD AND EQUIPMENT FOR THE PROTECTION OF POWER SYSTEMS AGAINST GEOMAGNETICALLY INDUCED CURRENTS

(75) Inventors: Mats A F Klercker Alakula, Kavlinge (SE); Sture Lindhal, Lund (SE)

(73) Assignee: Forskarpatent I Syd AB, Lund (SE)

( * ) Notice: Subject to any disclaimer, the term of this patent is extended or adjusted under 35 U.S.C. 154(b) by 0 days.

(21) Appl. No.: 11/557,330

(22) Filed: Nov. 7, 2006

(65) Prior Publication Data

US 2007/0217103 A1 Sep. 20, 2007

Related U.S. Application Data

(63) Continuation of application No. PCT/SE2005/000659, filed on May 4, 2005.

(30) Foreign Application Priority Data

May 10, 2004 (SE) .................................... 0401193

(51) Int. Cl.
*H02H 7/04* (2006.01)

(52) U.S. Cl. ........................................................ 361/35

(58) Field of Classification Search .................... 361/35
See application file for complete search history.

(56) References Cited

U.S. PATENT DOCUMENTS 2,917,714 A 12/1959 Jensen
3,122,699 A 2/1964 Schohan
3,504,318 A 3/1970 Wilburn et al.
3,509,507 A 4/1970 Specht
4,104,687 A * 8/1978 Zulaski ........................ 361/17
5,406,437 A 4/1995 Levin
5,557,249 A 9/1996 Reynal
5,576,942 A * 11/1996 Beverly et al. ................ 363/39

(Continued)

FOREIGN PATENT DOCUMENTS

EP 0511417 A1 11/1992

(Continued)

OTHER PUBLICATIONS

Xiadang et al., "Study and discussion of methods for mitigating and eliminating geomagnetically induced current (GIC)";Automation of Electric Power Systems; China; 2000, vol. 24, No. 7; pp. 58-60.

(Continued)

*Primary Examiner*—Michael J Sherry
*Assistant Examiner*—Christopher J Clark
(74) *Attorney, Agent, or Firm*—Gauthier & Connors LLP

(57) ABSTRACT

The present invention relates to a method for protection of power transformers and other power system components, which are vulnerable to geomagnetically induced currents, which comprises feeding from an overhead line/s or cable conductor/s one or more DC-diverter consisting of primary diverter windings and compensation windings applied on a respective magnetic core leg, which diverter is connected to critical busses, and diverting "quasi" direct current flowing on the overhead lines or cable conductors as a result of the earth surface potential gradients caused by geomagnetically induced currents, as well as a DC diverter to carry out the method.

5 Claims, 2 Drawing Sheets

U.S. PATENT DOCUMENTS

| | | | | | |
|---|---|---|---|---|---|
| 5,790,356 | A | * | 8/1998 | Bottrell et al. | 361/35 |
| 6,043,569 | A | * | 3/2000 | Ferguson | 307/105 |
| 6,466,466 | B1 | | 10/2002 | Karlsson et al. | |
| 6,718,271 | B1 | * | 4/2004 | Tobin | 702/58 |
| 7,170,268 | B2 | | 1/2007 | Kim | |

FOREIGN PATENT DOCUMENTS

| | | | |
|---|---|---|---|
| SU | 1631658 | | 2/1991 |
| WO | WO2005001857 | * | 1/2005 |
| WO | WO2005022716 | * | 2/2005 |

OTHER PUBLICATIONS

Viana et al., "Transformer Design Considerations for Mitigating Geomagnetic Induced Saturation"; IEEE Transactions on Magnetics, vol. 35, No. 5; Sep. 1999; pp. 3532-3534.

Viana et al., "Transformer Design Considerations for Mitigating Geomagnetic Induced Saturation," IEEE Transactions of Magnetics, vol. 35, No. 5, Sep. 1999, pp. 3532-3534.

Xiangdong et al., "Study and Discussion of Methods for Mitigating and Eliminating Geomagnetically Induced Current (GIC)," Automation of Electric Power Systems, vol. 24, No. 7, Apr. 11, 2000, pp. 58-60.

* cited by examiner

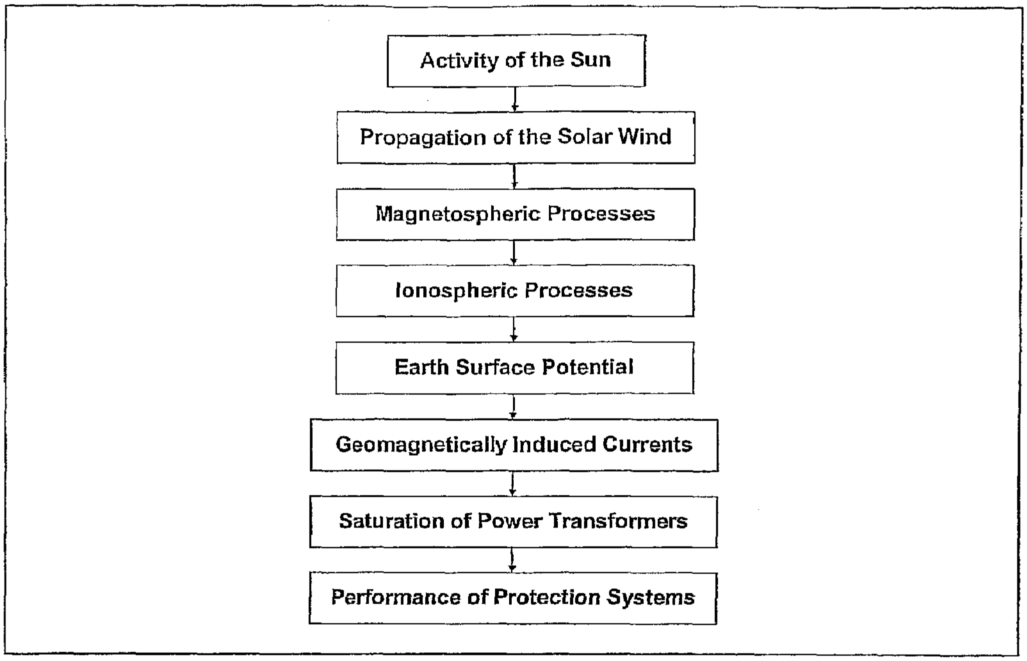
Figure 1: Effect of GIC on Protection Systems.

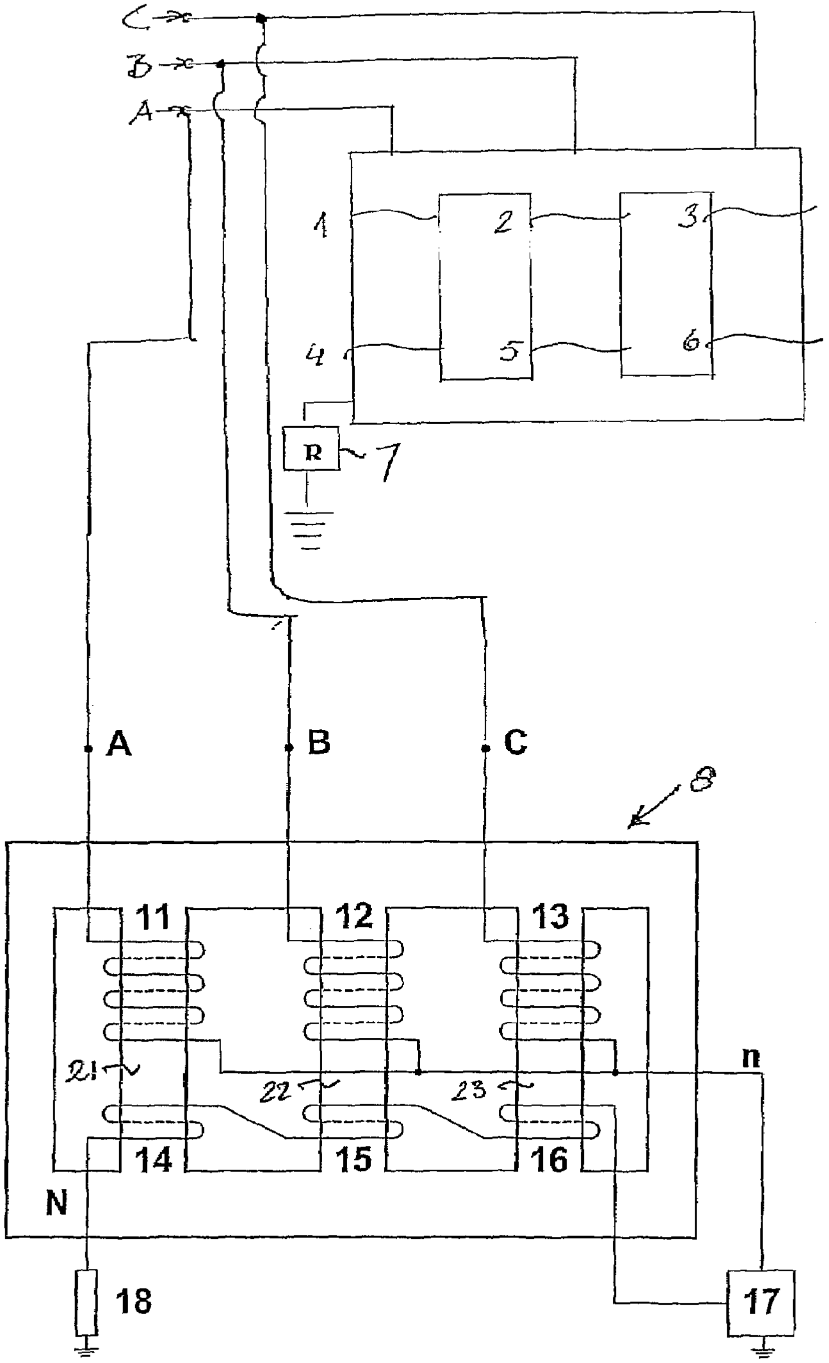
Figure 2: DC-diverter.

METHOD AND EQUIPMENT FOR THE PROTECTION OF POWER SYSTEMS AGAINST GEOMAGNETICALLY INDUCED CURRENTS

PRIORITY INFORMATION

This application is a continuation of International Application Ser. No. PCT/SE2005/000659 filed on May 4, 2005 which claims priority to Swedish Application No. 0401193-8 filed May 10, 2004, both of which are incorporated herein by reference in their entirety.

TECHNICAL FIELD

Geomagnetic disturbances pose hazards to several man-made systems because the Geomagnetically induced currents (GICs) flow in electrically conducting systems, such as power transmission networks, oil and gas pipelines, telecommunication cables and railway equipment.

BACKGROUND OF THE INVENTION

The primary task of a power transformer is to act as an electric "gear box" and sometimes to create a galvanic isolation, allowing electric energy to flow from one electrical ● system to another. The electrical systems interconnected with a transformer usually have different voltages but always the same frequency. The power transformer, in its simplest form, comprises generally at least two windings, a primary winding and a secondary winding. The transformation ratio is defined by the winding turns in the primary and secondary winding and the connection of the windings, e.g., in "delta" or "Y"-connection.

In the transferring of large powers at high voltages over large distances, the geomagnetic field at changes thereof imposes an often quite large quasi-direct current, (DC) in the power line(-s), so called zero sequence current or GIC, which direct current accompanies the alternating current phase (AC-phase). The phase lines can be regarded as one line over long distances as the distance between each line becomes relatively small, which causes the induction of the DC current, the zero sequence current, to be equal in all phases, when the geomagnetic field is subjected to changes.

The direct current gives rise to unilateral magnetization levels of any transformer in the system, which may cause the core of the transformer to enter magnetic saturation. This leads to the transformer consuming high magnetizing currents, thus being disconnected, normally by means of a protecting system, which releases the transformer from the system. When a transformer is disconnected, released, from the system, this will of course lead to disturbances in the transmission and distribution of electrical energy.

Geomagnetically induced currents (GICs) may, as mentioned above, damage power transformers because of half-cycle saturation of the core and heat developed in iron parts of the transformer. The saturation of the iron core alters the flux paths in the transformers. Parts, such as the tank and press beams, that usually carry only very low flux may be forced to carry much higher force. The increased flux may significantly increase the heat developed in such non-laminated parts of the transformer. The heat dissipation may be so high that the transformer oil starts to boil after a short while.

IEEE Transactions on Magnetics, vol. 35, no. 5, (1999), Transformer Design Considerations for Mitigating Geomanetic Induced Saturation by Viana, W. C. et al discloses the application of an, auxiliary winding used to compensate for GIC. The paper discloses the use of an open delta auxiliary winding which is fed by an adjustable current source. The paper more particularly discusses the placement of the auxiliary winding.

U.S. Pat. No. 1,631,658 discloses a three-phase overhead transmission line with grounded neutral, which line has supply and receiving transformer windings connected into reverse zigzag. By this design fluxes within each transformer column resulting from identical currents in different phases have opposite direction but equal magnitude. The fluxes compensate one another and the resultant total flux is zero. Hereby the transformer cores do not saturate.

Autom. Electr. Power Syst. (China), Apr. 10, 2000, Xue xiangdang et al discloses a geomagnetically induced current compensation at power transformers, wherein FIG. 3 discloses a schematic diagram of compensating GIC by self-excitation, whereby the middle point is connected to ground via actual compensation windings, whereby the transformer becomes self-compensating.

SE patent application S/N 0301893-4 filed Jun. 27, 2003, which corresponds to U.S. patent application Ser. No. 11/3189838 filed Dec. 27, 2005 discloses introduction of a passive compensation system of direct current, zero sequence current, induced by geomagnetic field changes in transforrriers eliminating high magnetization saturation levels, whereby a first impedance (Z1) is arranged from the neutral point to ground in parallel to the compensation winding, which impedance provides a high impedance for low or zero frequencies, and any preferably, a low impedance for higher frequencies There is hence a strong incentive to prevent direct current to flow through the transformer. As evident from above there are proposals to connect various neutral point devices between the neutral point of a Y-connected transformer winding and earth to reduce or completely eliminate the direct current through transformers. The proposals include: (1) a neutral point resistor, (2) a neutral point capacitor, (3) a DC motor, and (4) elimination of low-impedance neutral point devices only using an overvoltage protective device at the neutral point. One disadvantage with such devices is that the transformer may have graded insulation and the insulation level at the neutral may be too low to withstand the voltage at earth-faults near of the busbar where the transformer is connected. Another disadvantage with such neutral point devices is that they force the direct current to flow through other transformers and makes it necessary to equip also them with neutral point devices.

Geomagnetically Induced Currents flow through transformer windings and create a magnetic field that can saturate the transformer core. This causes the power frequency (50 Hz or 60 Hz) AC magnetic flux to spread out through the windings and structural members of the transformer producing eddy currents that can cause hotspots, which may severely damage the transformer. The magnetising current of the transformer increases significantly during the part of each AC cycle when the magnetic core enters into saturation. The spikes in the magnetising current result in AC waveforms with high harmonic content. These increased harmonics cause incorrect operation of protective relays and may cause disconnection of power lines. The increased reactive power demand accompanied with unwanted operation of protective relays may cause a collapse of power systems.

The geomagnetically induced current is an intermediate variable in the complicated space weather chain starting from the sun and ending in the protection system as indicated in FIG. 1, which is an adaptation of similar charts previously published by Boteler [2] and Pirjola [3].

Aspnes et al. [1 3 have described the complicated process as follows: The Sun is continuously emitting charged particles consisting of protons and electrons into the interplanetary space. This conducting particle flux is called the solar wind. The magnetic field of the Earth could be approximated, as a dipole was it not for the continuous flow of the solar wind. The pressure of the solar wind compresses the magnetic field lines on the sun side of Earth. This distortion of the Earth's magnetic field results in a comet-shaped cavity called the magnetosphere. The protons and electrons, being of opposite charge, are deflected in opposite directions, resulting in an electric current flow. The field aligned currents flow down into the ionosphere. In the lower ionosphere, the protons are slowed by collision with molecules of the atmosphere while the electrons move freely constituting a large current flow called the electrojet. The electrojet is known to be located at least 100 kilometers above the Earth's surface. Electrojet currents of tens of thousands Ampere disturb the magnetic field measured at the surface of the Earth and induce current in the surface of earth.

The induced currents are thus called the geomagnetically induced currents resulting in a time varying earth surface potential. Extended conducting object connected to the earth at several locations tend to shunt the geomagnetically induced current. The objects, like power transmission systems, will, in addition to the fundamental frequency current, carry very low-frequency current. The period of the geomagnetically induced current is usually in the order of minutes and is essentially a direct current in comprising with the fundamental frequency (usually 50 or 60 Hertz).

The current in the power transmission system enters and leaves the power system via earthed neutral points, like transformer neutral. The magnitude of the currents entering and leaving the power system via power transformers may be as high as 300 Ampere. Each winding then carries about ⅓ of the neutral point current and this DC component is very high in comparison with the steady-state fundamental-frequency magnetising current of the transformer. The magnetic material of the core limbs enters into half-cycle saturation. The magnetising current of the transformer becomes very high in comparison with the normal magnetising current. The half-cycle saturated transformer draws a severely distorted current from the power system and distorts the waveform of the voltage on the associated busbar. The general voltage depression, the distorted current and voltage waveforms, and the harmonics may cause incorrect operation of the protection system.

SUMMARY OF THE PRESENT INVENTION

This invention relates to a DC-diverter, which shunts the direct current from the sensitive power transformers to an alternative path or to alternative paths. The DC-diverter is designed to withstand the direct current caused by geomagnetic storms and the alternating currents associated with earth faults near the bus where the DC-diverter is connected. In a substation with several power transformers, one DC-diverter can eliminate the need to install several neutral point devices and avoid installing several transformers that are designed to withstand direct current.

In particular the invention relates to a method for protection of power transformers and other power system components, which are vulnerable to geomagnetically induced currents, which comprises feeding from an overhead line/s or cable conductor/s one or more DC-diverter consisting of primary diverter windings and compensation windings applied on a respective magnetic core leg, which diverter is connected to critical busses, and diverting "quasi" direct current flowing on the overhead lines or cable conductors as a result of the earth surface potential gradients caused by geomagnetically induced currents.

In a preferred embodiment the diverter is connected to power lines of power transformer/s equipped with one or more neutral point resistor to allow lower DC resistance of the DC-diverter.

In a further preferred embodiment one or more diverter reactor equipped with neutral point resistors to allow lower DC resistance of the DC-diverter.

Another aspect of the invention relates to a DC-diverter to carry out the method of above, consisting of a magnetic core structure having three phase legs, each leg provided with a primary diverter winding and each provided with a diverter compensation winding and having a filter connected to the neutral point of the three-phase diverter to reduce the harmonics, to eliminate flow of these through the compensation winding, and whereby the diverter has an impedance lower than that of a component diverted from.

In a preferred embodiment thereof a coreless (air-core) reactor is connected between a terminal of the compensation winding and the earthing system.

In a further preferred embodiment it is equipped with a filter and with a neutral point reactor.

BRIEF DESCRIPTION OF THE DRAWINGS

FIG. 1 is a chart showing the effects of GIC on Protection Systems; and the latter FIG. 2 show a schematic diagram of a DC-diverter in accordance with the invention.

DESCRIPTION OF THE INVENTION

FIG. 2 shows a 3-phase power line, with phase lines A, B, and C, respectively, having at its end a three-phase transformer reducing the voltage from 400 kV to 50 kV. However, any primary voltage may be used such as 765, 500, 400, 345, or 220 kV, while the secondary voltage may be 110, 70, 50, 40, 30, 20, 10 or 6 kV.

The transformer may take any physical form used in the art, such as a three-legged one, a four-legged one, or a five-legged one, a temple designed one, a modified temple designed one, or simply being three one-phase transformers connected in a suitable manner. FIG. 2 is a schematic view showing three primary windings, 1, 2, and 3, and three secondary windings 4, 5, and 6. Between the earth point and earth there is a resistance 7, suitably less than 10 ohms, to provide an impedance higher than for a DC-diverter, generally denoted 8.

The DC-diverter comprises, in the embodiment shown, a basic transformer magnetic core structure having three phase legs 21, 22, and 23, respectively, but no secondary windings. Thus, each phase leg is connected to the primary lines A, B, and C, respectively, and each primary line leads into a primary diverter winding 11, 12, and 13 respectively of the diverter 8. The ends of the primary windings are connected to a common harmonic filter 17, which in turn is connected to earth. Further, on each phase leg there is a compensation winding 14, 15, and 16, respectively. The number of turns of the compensations windings is one third of the number of turns of the primary diverter windings 11, 12, and 13. Besides being connected to the harmonic filter 17, the compensation windings, forming one continuous line between the legs, is connected to earth via a neutral point reactor 18.

FIG. 2 shows one embodiment of the DC-diverter. It is connected to the three phases of the three-phase power system to be protected against geomagnetically induced currents. The DC-diverter has three phase-terminals (A, B, and C) and three main-windings (11, 12, and 13). Each main winding is wound on a leg of the magnetic core, which also carries one compensation winding (14, 15, or 16). The core has three main legs and may or may not have two additional legs. The two outer legs make it possible to reduce the height of the yoke and hence the entire core. The number of turns of a main winding is three times the number of turns of a compensation winding.

Assume that a direct current IDC flows in each of the main-windings from the phase terminals to the internal neutral point n. Assume, for the moment, that the current from the filter circuit to earth is equal to zero. Then the current in the three compensation windings is equal to $3I_{DC}$ and the resulting MMF acting on each leg of the core is close to zero. This mean that the unidirectional flux in each leg is low.

Further, assume that the DC-diverter is connected to a power system, that all three phase-to-earth voltages have the same magnitude, and that the difference in the phase angle of the phase-to-earth voltages is equal to 180 degrees. Assume, for the moment, that the inductances of the core are independent of the magnitude of the current in the windings. Then, the three phase-currents have almost the same magnitude and the difference in the phase angle of the phase-currents is equal to 180 degrees. The magnitude of the phase currents depends on the design of the core and can be increased by introducing air-gaps in the main legs. In this case, the sum of the three phase-currents is close to zero.

The magnetising curve of the ferromagnetic material in the core is non-linear. It is desirable to use the material as effective as possible, which means that the peak flux is fairly close to the saturation flux of the core material. Assume that the applied voltage is a perfect symmetrical sinusoidal voltage. Then each phase-current will contain odd harmonics because of the non-linear characteristic of the magnetic material. The phase-currents will not contain any even harmonics because the applied voltage is half-wave symmetrical and we may assume that the magnetic material of the core is symmetric. The sum of the three phase-currents would hence not be equal to zero if the internal neutral point (n) had been connected to earth. This residual current would contain harmonics with frequencies, which are equal to three times the frequency of the fundamental frequency. The other odd harmonics have a phase shift of 120 degrees and their sum is close to zero. This means that the residual current will contain the triplets of the fundamental frequency current and very small component of the other harmonics. The filter (7) may be used to eliminate the triplen harmonics from the residual current so that only the quasi direct current flows through the compensation windings.

Assume that the magnitude of the three phase-to-earth voltages is equal and that they have the same phase angle. We say that the source voltage is a pure zero-sequence voltage. This means that the fundamental frequency MMF on each leg is close to zero. This means that the zero-sequence impedance of the DC diverter proper is low. The introduction of such a DC-diverter could reduce the zero-sequence impedance of the network too much. The zero-sequence current might become higher than the three-phase short-circuit current, which could result in requirements to reinforce the fault withstand capability of the power system. The zero-sequence current can easily be reduced below the three-phase short-circuit current if a reactor is connected between the external neutral point (N) and substation earthing system. This neutral-point reactor should preferably be of the coreless (air-core) type to avoid saturation because of the direct current diverted from the power system.

Theoretically, the zero-sequence reactance of DC-diverter proper is equal to zero and the zero-sequence resistance is equal to the average value of the resistance of the phase-windings (11, 12 and 13) plus three times the sum of the resistance of the three compensation windings (14, 15, and 16). The zero-sequence reactance of the DC-diverter including the neutral point reactor is then essentially equal to three times the reactance of the neutral point reactor. The zero-sequence resistance of the DC-diverter including the neutral point reactor is then equal to the zero-sequence resistance of the DC-diverter proper plus three times the resistance of the neutral point reactor. It is hence possible to design the neutral point reactor so that it limits the fault current at earth-fault near the DC-diverter so that the earth-fault current becomes less than the fault current at a bolted three-phase fault.

The invention claimed is:

1. A method for protection of power transformers and other power system components, which are vulnerable to geomagnetically induced currents, which comprises feeding a DC-diverter from at least one of an overhead line or a cable conductor connected to the power transformers, said DC-diverter consisting of primary diverter windings and compensation windings applied on a respective magnetic core leg, which at least one DC-diverter is connected to critical busses, and diverting "quasi" direct current flowing on the at least one of an overhead line or a cable conductor as a result of earth surface potential gradients caused by geomagnetically induced currents, wherein said DC-inverter comprises a magnetic core structure having three phase legs, each leg provided with a primary diverter winding and each provided with a diverter compensation winding having a filter connected to the neutral point of the three-phase diverter to reduce harmonics, to eliminate flow of these through the compensation winding, and whereby the diverter has an impedance lower than that of a component diverted from.

2. A method according to claim 1, wherein the diverter is connected to at least one power line of at least one power transformer equipped with at least one neutral point resistor to allow lower DC resistance of the DC-diverter.

3. A method according to claim 1, wherein said at least one DC-diverter is equipped with neutral point resistors to allow lower DC resistance of the DC-diverter.

4. A DC-diverter to carry out the method of claim 1, wherein a coreless (air-core) reactor is connected between a terminal of the compensation winding and the earthing system.

5. A DC-diverter to carry out the method of claim 1, wherein it is equipped with a filter and with a neutral point reactor.

* * * * *